United States Patent
Mostavi et al.

(10) Patent No.: US 12,028,108 B1
(45) Date of Patent: Jul. 2, 2024

(54) NETWORK ANOMALY DETECTION BASED ON CUSTOMERS LIGHT LEVEL SIGNAL

(71) Applicant: FRONTIER COMMUNICATIONS HOLDINGS, LLC, Dallas, TX (US)

(72) Inventors: Milad Mostavi, Dallas, TX (US); Arman Ghasemi, Weatogue, CT (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/441,131

(22) Filed: Feb. 14, 2024

(51) Int. Cl.
*H04B 10/07* (2013.01)
*H04B 10/079* (2013.01)
*H04Q 11/00* (2006.01)

(52) U.S. Cl.
CPC ..... *H04B 10/0791* (2013.01); *H04Q 11/0067* (2013.01); *H04Q 2011/0083* (2013.01)

(58) Field of Classification Search
CPC ............................. H04B 10/07; H04B 10/0791
See application file for complete search history.

(56) References Cited

U.S. PATENT DOCUMENTS

| | | | | |
|---|---|---|---|---|
| 2009/0220226 A1* | 9/2009 | Hehmann | ............. | H04J 3/1694 398/25 |
| 2012/0093499 A1* | 4/2012 | Dvir | ................... | H04B 10/0795 398/20 |
| 2012/0163800 A1* | 6/2012 | Urban | ................... | H04B 10/071 398/12 |
| 2014/0233940 A1* | 8/2014 | Pitzer | ................... | H04B 10/272 398/8 |
| 2015/0226788 A1* | 8/2015 | Toda | ................... | H04B 10/0799 324/762.07 |
| 2016/0187224 A1* | 6/2016 | Chen | ................... | G01M 11/3181 356/73.1 |
| 2022/0345213 A1* | 10/2022 | Tabet | ................. | H04B 10/0731 |

* cited by examiner

*Primary Examiner* — Shi K Li

(74) *Attorney, Agent, or Firm* — MARSHALL, GERSTEIN & BORUN LLP

(57) ABSTRACT

Techniques for detecting an anomaly in a PON include generating an optical profile for the PON based on characteristics of network light level signals, collected over a first time period, delivered over the PON, and generating an optical profile for a customer based on characteristics of customer light level signals, collected over the first time period, delivered over the PON to or from an ONT for the customer. The techniques also include obtaining customer light level signals collected over a second time period, and detecting an anomaly in the PON for the customer in response to determining that the customer light level signals collected over the second time period deviate from the optical profile for the customer or the optical profile for the PON by more than a threshold amount.

17 Claims, 9 Drawing Sheets

NETWORK ANOMALY DETECTION BASED ON CUSTOMERS LIGHT LEVEL SIGNAL

FIELD OF THE DISCLOSURE

This disclosure relates generally to passive optical networks, and, more particularly, to systems and methods for detecting an anomaly in a passive optical network using light level signals.

BACKGROUND

A conventional PON includes one or more optical line terminals (OLTs) at a central location connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

Typically, the effects of anomalies within the PON (e.g., equipment malfunctions, signal loss, network congestion, broken optical fibers, or other technical issues) are observed by customers or end-users at locations at which last mile termination units are disposed. For example, a customer may observe a slowing down or lack of fidelity of PON services at his or her location, and may contact the PON service provider for assistance. However, the customer may have to wait a long time before the problem is diagnosed and properly addressed. Additionally, several customers may have the same or similar problems indicating that the point of failure is coming from a device which communicates with each of the customer's LMTUs. However, a technician may not be able to accurately and quickly identify the root cause of the anomaly, especially if the customers communicate with different technicians.

SUMMARY

To proactively detect anomalies in the PON before customers notify the service provider of network issues, an anomaly detection system detects and analyzes variations in light levels of optical signals transmitted through optical fibers across the PON. The anomaly detection system generates an optical profile for the PON based on the variations in light levels of optical signals across the PON over a first time period (e.g., the previous 14 days). For example, the anomaly detection system may generate a distribution of network light level signals across the PON over the first period (e.g., having a mean and standard deviation). Additionally, the anomaly detection system generates a customer-specific optical profile for a customer based on variations in light levels of optical signals transmitted to or from the customer's ONT over the first time period. For example, the anomaly detection system may generate a distribution of customer light level signals transmitted to and/or from the customer's ONT over the first period.

Then the anomaly detection system obtains customer light level signals transmitted to and/or from the customer's ONT over a second, shorter time period (e.g., the current day) and compares the customer light level signals to the optical profile for the PON and/or the customer-specific optical profile. In this manner, the anomaly detection system can not only determine whether the light level signals are outside the normal range across the network, but whether the light level signals deviate significantly from the normal range for the particular ONT.

By analyzing variations in light levels of optical signals, anomalies can be detected with precision. This approach leverages the inherent sensitivity of optical signals to changes in the network environment, making it possible to identify irregularities that may go unnoticed. By continuously monitoring and analyzing light level signals, the anomaly detection system can proactively respond to potential malfunctions and ensure the integrity and reliability of the network infrastructure. This ultimately enhances the overall network performance for customers.

The anomaly detection system may detect an anomaly when the customer light level collected over the second time period deviates from a moving average of the network light level over the first time period by more than a threshold amount (e.g., more than 2 standard deviations in the distribution of network light level signals), and/or deviates from a moving average of the customer light level over the first time period by more than a threshold amount (e.g., more than 2 standard deviations in the distribution of customer light level signals).

The anomaly detection system may also detect an anomaly when there is an abnormal trend in the customer light level signals collected over the second time period. More specifically, the anomaly detection system may identify trends by determining the slope of light level signals as a function of time. The anomaly detection system may compare the slope to slopes in the distribution of network light level signals and/or the distribution of customer light level signals to identify an abnormal trend when the slope deviates by more than a threshold amount from the slopes in the network light level signals and/or customer light level signals.

Accordingly, the anomaly detection system combines light level signals of millions of customers via statistical modeling and provides an inference over the trajectory of normal light level behavior for each customer. The abnormal detection is uniquely scalable and minimizes computational cost over machine learning models where training is needed and prediction on a customer-specific basis is more difficult due to not having enough training data for one particular customer.

In an embodiment, a method for detecting an anomaly in a Passive Optical Network (PON) using light level detection includes generating an optical profile for a PON based on one or more characteristics of network light level signals collected over a first time period and delivered over the PON. The PON includes an optical line terminal (OLT) optically connected to a optical network terminals (ONTs) via a plurality of optical fibers. The method further includes generating an optical profile for a customer based on one or more characteristics of customer light level signals collected over the first time period and delivered over the PON to or from an ONT for the customer. Additionally, the method includes obtaining one or more customer light level signals collected over a second time period and delivered over the PON to or from the ONT for the customer. Moreover, the method includes detecting an anomaly in the PON for the customer in response to determining that the one or more customer light level signals collected over the second time period deviate from the optical profile for the customer or the optical profile for the PON by more than a threshold amount, and providing an indication of the anomaly to at least one of a user interface or another computing device.

In another embodiment, a computing device for detecting an anomaly in a Passive Optical Network (PON) using light level detection includes one or more processors, and a non-transitory computer-readable memory storing instructions thereon. When executed by the one or more processors, the instructions cause the computing device to generate an optical profile for a PON based on one or more characteristics of network light level signals collected over a first time period and delivered over the PON. The PON includes an optical line terminal (OLT) optically connected to a plurality of optical network terminals (ONTs) via a plurality of optical fibers. The instructions further cause the computing device to generate an optical profile for a customer based on one or more characteristics of customer light level signals collected over the first time period and delivered over the PON to or from an ONT for the customer. Additionally, the instructions cause the computing device to obtain one or more customer light level signals collected over a second time period and delivered over the PON to or from the ONT for the customer. Moreover, the instructions cause the computing device to detect an anomaly in the PON for the customer in response to determining that the customer light level signals collected over the second time period deviate from the optical profile for the customer or the optical profile for the PON by more than a threshold amount, and provide an indication of the anomaly to at least one of a user interface or another computing device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
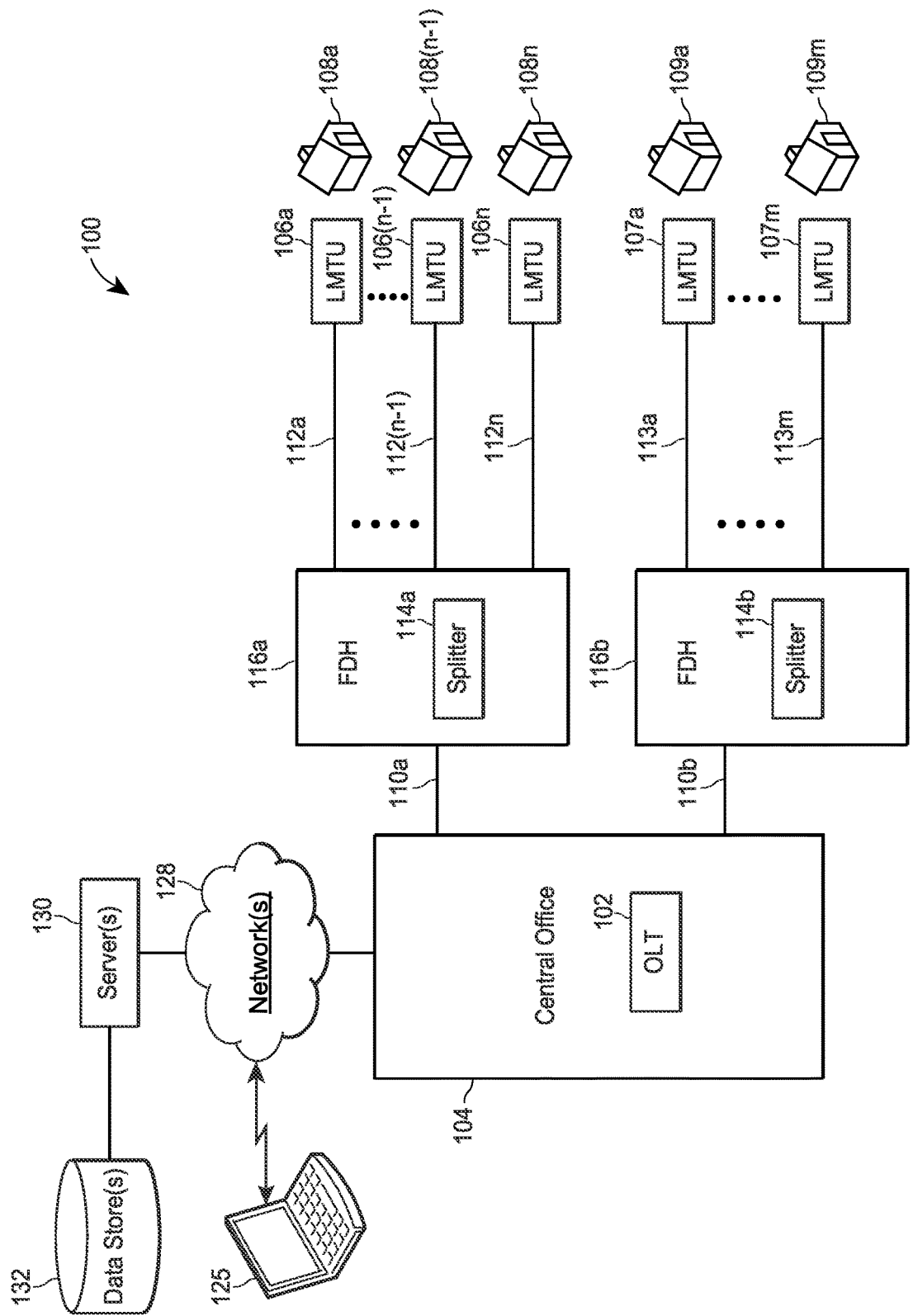
FIG. 1 is a block diagram of an example passive optical network (PON) in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing techniques for managing components of PONs by leveraging optical profiles of the PON and/or optical profiles of customer ONTs. Generally speaking, an "optical profile," as utilized herein, generally corresponds to a statistical model or distribution of one or more characteristics of optical signals which are delivered over the PON during a first time period, and may be based on measurements of the optical signals.

For example, the distribution may be a distribution of light levels, including a mean light level and a standard deviation, where the mean light level is a moving average over the first time period. In another example, the distribution may be a distribution of slopes of trend components of light level signals, including a mean slope and a standard deviation. In yet another example, the distribution may be a distribution of residual components of light level signals, including a mean residual component and a standard deviation.

An optical profile may be generated for light level signals across the PON (referred to herein as "network light level signals) or for light level signals specific to a particular customer that are transmitted to or from the customer's LMTU (referred to herein as "customer light level signals"). The network light level signals may include light level signals transmitted to and/or from several customer LMTUs, from an OLT to an FDH, from FDHs to the OLT, etc.

As used herein, a "trend component" (T) may generally refer to a filtered version of the light level signals collected over the first time period by removing high frequency components to smooth the data. For example, the trend component may include frequency components which are below a threshold frequency.

A "seasonality component" (F) as used herein, may generally refer to a frequency transform of the trend component, such as a Fourier transform.

As used herein, a "residual component," may generally refer to the difference between the original light level signals (O) collected over the first time period and the sum of the trend and seasonality components (e.g., O-T-F).

Reference will now be made in detail to non-limiting examples, some of which are illustrated in the accompanying drawings.

Example Passive Optical Network (PON)

FIG. 1 is a block diagram of an example PON 100 in which the systems, methods, and techniques of the present disclosure may be implemented. The example PON 100 includes one or more optical line terminals (OLTs) (an example one of which is designated by reference numeral 102) at a central location (e.g., at a central office 104) optically connecting to one or more last mile termination units 106a, . . . , 106n at respective customer premises 108a, . . . , 108n. The last mile termination units 106a, . . . , 106n may be located outside and/or inside the customer premises or locations 108a, . . . , 108n. Each last mile termination unit 106a, . . . , 106n may be, for example, an optical network unit (ONU) or an optical network terminal (ONT). In some examples herein, the term "optical terminal" generally refers to a last mile termination unit (e.g., an ONU or ONT) or an OLT.

The example PON 100 is implemented using instances of point-to-multipoint topology. For example, in the example PON 100, a first feeder optical fiber 110a from the OLT 102 (which is interchangeably referred to herein as an "F1 optical fiber 110a" or a "primary optical fiber 110a") serves the one or more last mile termination units 106a, . . . , 106n via respective distribution optical fibers 112a, . . . , 112n (which are interchangeably referred to herein as "F2 optical fibers 112a, . . . , 112n" or "secondary optical fibers 112a, . . . , 112n"). In the illustrated example, the first feeder optical fiber 110a is optically coupled to the plurality of last mile termination units 106a, . . . , 106n via an example one-to-many optical splitter 114a which is disposed, located, implemented, etc. in an example fiber distribution hub (FDH) 116a. In some arrangements, the FDH 116a is located within a geographic area (e.g., a neighborhood) such that the customer premises 108a, . . . , 108n are proximally close to the FDH 116a, and typically each of the customer premises 108a, . . . , 108n and respective last mile termination units 106a, . . . , 106n is disposed at a different optical distance from the FDH 116a. An "optical distance," as generally utilized herein, refers to a distance over which an optical signal travels.

In embodiments, the PON 100 may or may not include additional feeder optical fibers and optical splitters for a plurality of additional customer premises. Moreover, a PON may or may not include a plurality of FDHs. For example, as shown in FIG. 1, the example PON 100 includes a second feeder or primary optical fiber 110b from the OLT 102 that is optically coupled to another plurality of last mile termination units 107a-107m at respective customer premises 109a-109m via another many-to-one optical splitter 114b included in another fiber distribution hub 116b and via respective secondary optical fibers 113a-113m.

As utilized herein, the "components" of the PON 100 generally refer to the devices, nodes, and optical fibers of the PON 100. For example, the components of the PON 100 shown in FIG. 1 may include the OLT 102, the FDHs 116a, 116b, the splitters 114a, 114b, the LMTUs 106a-106n and 107a-107m, and the optical fibers interconnecting the devices or nodes, e.g., the optical fibers 110a-110b, 112a-112n, and 113a-113m.

In some scenarios, an optical terminal (e.g., the OLT 102 and/or one or more the last mile termination units 106a-106n, 107a-107m) may transmit optical test signals and/or patterns, indication light, and/or other types of measurement signals into an optical fiber in response to control signals received from a computing device. For example, the OLT 102 and/or the one or more LMTUs 106a-106n, 107a-107m may receive control signals from a computing device 125 (e.g., a laptop, a computer, a tablet, a mobile phone, etc.) associated with a service technician or other agent of the PON 100. In some examples, the computing device 125 controls an optical terminal of the PON 100 via one or more networks 128 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 1). Additionally and/or alternatively, control signals may be received from one or more servers 130 of the PON 100 that are used to manage the PON 100, the network(s) 128, etc. For example, the one or more servers 130 may schedule and execute diagnostics of various components of the PON 100 and/or of the PON 100 as a whole, generate alerts and alarms, initiate various actions, provide user interfaces, which may include graphical user interfaces (e.g., at the computing device 125), log, historize, and/or otherwise store data generated by and associated with the PON 100 (e.g., in one or more data stores 132), and the like. For example, one or more applications may execute at the server(s) 130 and/or the server(s) may host one or more services to provide management, administrative, and/or test functionalities of the PON 100.

More specifically, the server 130 may execute an anomaly detection application to detect anomalies in the PON 100 by analyzing light levels of optical signals. The components of the PON 100 may include optical detectors to detect light level signals at upstream or downstream endpoints of the optical fibers 110a-110b, 112a-112n, and 113a-113m. For example, an LMTU 106a may include an optical detector to detect the light levels of optical signals at a downstream endpoint of the optical fiber 112a. The FDH 116a may include optical detectors to detect the light levels of optical signals at upstream endpoints of the optical fibers 112a-112n. As utilized herein, the term "upstream" refers to a direction towards the central office 104, and the term "downstream" refers to a direction away from the central office 104.

In any event, the server 130 receives the light level signals from the optical detectors and analyzes the light level signals to detect anomalies in the PON 100. When the server 130 detects an anomaly, the server 130 may present an indication of the anomaly on a user interface, or provide the indication of the anomaly to a computing device 125 to present the indication of the anomaly. Additionally, the server 130 may determine a root cause of the anomaly and present an indication of the root cause on a user interface, or provide the indication of the root cause to a computing device 125 to present the indication of the root cause. In this manner, a service technician or other agent of the PON 100 may see the indication of the anomaly and/or the root cause and proactively address the issue to reduce downtime and enhance network performance.

The anomaly detection application may execute in whole or in part on the server 130 or the computing device 125. In some implementations, some portions of the anomaly detection application may execute on the server 130 while other portions execute on the computing device 125. In other implementations, the anomaly detection application executes entirely on the server 130 or entirely on the computing device 125.

In some implementations, when an anomaly is detected, the server 130 or the computing device 125 may transmit a control signal to a component of the PON 100 (e.g., an LMTU 106a, an FDH 116a, etc.) to for example, automatically reboot or reset the component of the PON 100. In some implementations, the server 130 or computing device 125 may transmit a control signal to the component to automatically reboot or reset a light source within the component that emits optical signals. In this manner, the PON 100 may automatically respond to a malfunction without human intervention.

Various information and data associated with, utilized by, and/or generated by the PON 100 may be stored in the data stores 132 of the PON 100. For example, the data store(s) 132 may store statistical models, such as optical profiles for the PON 100 and customer-specific optical profiles. Moreover, the data store(s) 132 may store original, trend, seasonality, and residual components of network and customer light level signals collected over a first time period (e.g., 14 days). The data store(s) 132 may also store records of customer contact events with a technical support organization supporting the PON 100, service call records, records of operating conditions and events which occurred, logbooks, and the like. Additionally, the data store(s) 132 may store applications which may execute at the one or more servers 130, and/or which may be downloaded or otherwise provided to the technician computing device 125 for installation and execution thereon. Further, the data store(s) 132 may store data indicative of performance, faults, diagnostics, statuses, states, and/or other data corresponding to the components of the system 100. Still further, the data store(s) 132 may store data indicative of the architecture, infrastructure, and component connectivity of the PON 100, including identifications of various PON components and indications of which PON components connect to which other PON components. Of course, the data store(s) 132 may store any updates to any and all of the information and data stored therein.

The example servers 130, optical terminals (e.g., any of the OLT 102, the last mile termination units 106a, 106n), and/or the example computing system 125 may include a processing platform capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform may be, for example, one or more servers, a cloud computing system, a computer, a workstation, a laptop, a mobile device (e.g., a cell phone, a smart phone, a tablet such as an IPAD™), or any other type of computing device or system.

The example processing platform includes one or more processors, one or more memories, one or more network interfaces, one or more input/output (I/O) interfaces, and/or a set of data stores, all of which are interconnected via one or more address/data bus or communication links.

The processors may be implemented using hardware, and may include a semiconductor based (e.g., silicon-based) device. The processors may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processors may be a field programmable gate array (FPGA), an application specific integrated circuit (ASIC), etc. that implements operations of the example methods described herein without executing instructions.

The memories are accessible by the processors (e.g., via a memory controller). The example processors interact with the memories to obtain, for example, machine-readable instructions stored in the memories corresponding to, for example, the operations represented by the flowcharts of this disclosure. The example processors may also interact with the memories to store data, such as data formed or used during execution of machine-readable instructions. Example memories include any number and/or type(s) of volatile or non-volatile, non-transitory, machine-readable storage medium, devices or disks, such as a semiconductor memory, magnetically readable memory, optically readable memory, biologically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform to provide access to the machine-readable instructions stored thereon.

The example processing platform includes one or more communication interfaces such as, for example, the one or more network interfaces, and/or the one or more input/output (I/O) interfaces. The communication interface(s) enable the processing platform to communicate with, for example, another device, system, etc. (e.g., the OLT 102, the last mile termination units 106a, 106n, the one or more servers 130, the computing device 125, the one or more data stores 132, etc., any other database, and/or any other machine).

The example processing platform includes the network interface(s) to enable communication with other machines (e.g., the OLT 102, the last mile termination units 106a, 106n, the one or more servers 130, the computing device 125, etc.) via, for example, one or more networks such as the PON 100 and/or the network(s) 128. The example network interfaces include any suitable type of communication interface(s) (e.g., wired and/or wireless interfaces) configured to operate in accordance with any suitable communication protocol(s). Example network interfaces include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform includes the input/output (I/O) interface(s) (e.g., a Bluetooth® interface, a near-field communication (NFC) interface, a universal serial bus (USB) interface, a serial interface, an infrared interface, a PCI express interface, etc.) to enable the processors to communicate with peripheral I/O devices and/or other communication systems. For example, the I/O interface(s) may be used to control a light source, enable receipt of user input (e.g., from a touch screen, a keyboard, a navigation device such as mouse, touch pad, joystick or trackball, a microphone, a button, etc.) and communicate output data (e.g., visual indicators, instructions, data, images, etc.) to the user (e.g., via a display, a speaker, a printer, a communication interface, an antenna, etc.). The I/O interface(s) typically include a graphics driver card, graphics driver chip and/or graphics driver processor to drive a display when a display is present.

In some examples, the processing platform also includes, or is otherwise communicatively coupled to, a set of data stores or other data storage mechanisms (one or more of a HDD, optical storage drive, solid state storage device, CD, CD-ROM, DVD, Blu-ray disk, RAID, data storage bank, etc.). The set of data stores may include the example data stores 132.

To detect an anomaly in the PON 100, the anomaly detection application obtains light level signals detected via optical detectors over a first time period. The anomaly detection application may generate an optical profile for the PON 100 and a customer-specific optical profile for a customer based on the obtained light level signals. Then the anomaly detection application periodically or continuously monitors a customer light level signal transmitted to or from the customer's LMTU 106a and compares the customer light level signals to the optical profiles. For example, the anomaly detection application may obtain a customer light level signal collected over a second time period (e.g., 1 day).

Figure 2:
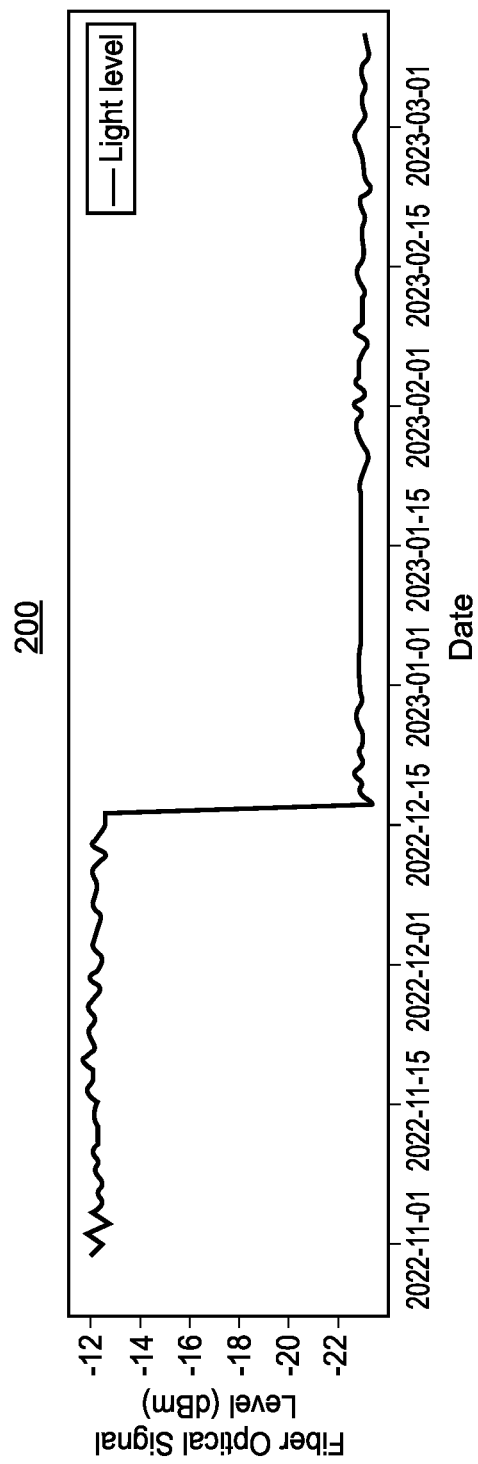
FIG. 2 is an example graph indicating the light level of a customer's optical signal as a function of time.

FIG. 2 illustrates an example graph 200 indicating the light level of a customer's optical signal as a function of time. For example, the light level may be the light level of optical signals received at the LMTU 106a. In the example graph 200, the light level is indicated as a measure of optical power in dBm. As shown in the example graph 200, the light level is steady at around −12 dBm from November 1-December 15. Then on December 15, the light level drops significantly to about −24 dBm and remains there. The anomaly detection application may obtain the customer light level over a second time period (e.g., 1 day) and compares the customer level light level over the second time period to the optical profile for the PON 100 and the customer-specific optical profile for the customer's LMTU 106a. In some implementations, the anomaly detection application obtains the customer light level once over the second time period (e.g., 1 time during the 1 day period). In other implementations, the anomaly detection application obtains the customer light level multiple times over the second time period, and determines the customer light level for the second time period as an average of the customer light levels obtained over the second time period or in any other suitable manner.

To generate an optical profile for the PON 100, the anomaly detection application obtains network light level signals across the PON 100 over the first time period. For example, the anomaly detection application may obtain a light level once a day from each of the components in the PON 100 over a 14 day period. Then the anomaly detection application may generate a distribution of network light level signals based on the obtained light levels over the 14 day period. The anomaly detection application may determine a mean light level as the moving average of the light levels for optical signals across the PON 100 over the previous 14 days. The anomaly detection application may also determine the standard deviation of the light levels for optical signals across the PON 100 over the previous 14 days. The anomaly detection application may assume a normal or Gaussian distribution for the network light level signals having a mean light level ($\mu$) and a standard deviation ($\sigma$) over the first time period as the optical profile for the PON 100. Then each day as additional network light levels are detected, the anomaly detection application may determine an updated moving average of the network light levels over the previous 14 days and an updated standard deviation.

The anomaly detection application may then compare the obtained customer level light level for the current day to the optical profile for the PON 100. For example, the anomaly detection application may calculate a population Z-score for the obtained customer level light level (X) by comparing the obtained customer light level (X) to the mean light level ($\mu$) and the standard deviation ($\sigma$) for the network light level signals collected over the previous 14 days. More specifically, the anomaly detection application may calculate the population Z-score according to the following equation:

$$Z = \frac{X - \mu}{\sigma} \quad \text{(Equation 1)}$$

The anomaly detection application may compare the population Z-score to a threshold population Z-score (e.g., 2). Then the anomaly detection application may detect an anomaly if the population Z-score exceeds the threshold population Z-score, is outside a threshold range of population Z-scores (e.g., from −2 to 2), or the absolute value of the population Z-score exceeds the threshold population Z-score.

To generate a customer-specific optical profile for the customer's LMTU 106a, the anomaly detection application obtains customer light level signals transmitted to or from the customer's LMTU 106a over the first time period. For example, the anomaly detection application may obtain a light level once a day from the customer's LMTU 106a over a 14 day period. Then the anomaly detection application may generate a distribution of customer light level signals based on the obtained light levels over the 14 day period. The anomaly detection application may determine a mean light level as the moving average of the light levels for optical signals transmitted to or from the customer's LMTU 106a over the previous 14 days. The anomaly detection application may also determine the standard deviation of the light levels for optical signals transmitted to or from the customer's LMTU 106a over the previous 14 days. The anomaly detection application may assume a normal or Gaussian distribution for the customer light level signals having a mean light level ($\mu$) and a standard deviation ($\sigma$) over the first time period as the customer-specific optical profile. Then each day as additional customer light levels are detected, the anomaly detection application may determine an updated moving average of the customer light levels over the previous 14 days and an updated standard deviation.

The anomaly detection application may then compare the obtained customer level light level for the current day to the customer-specific optical profile. For example, the anomaly detection application may calculate a customer-specific Z-score for the obtained customer level light level (X) by comparing the obtained customer light level (X) to the mean light level ($\mu$) and the standard deviation ($\sigma$) for the customer light level signals collected over the previous 14 days.

The anomaly detection application may compare the customer-specific Z-score to a threshold customer-specific Z-score (e.g., 2). In some implementations, the threshold population Z-score is the same as the threshold customer-specific Z-score. In other implementations, the threshold population Z-score is different from the threshold customer-specific Z-score. Then the anomaly detection application may detect an anomaly if the customer-specific Z-score exceeds the threshold customer-specific Z-score, is outside a threshold range of customer-specific Z-scores (e.g., from −2 to 2), or the absolute value of the customer-specific Z-score exceeds the threshold customer-specific Z-score.

In some implementations, the anomaly detection application detects an anomaly when the absolute value of the population Z-score exceeds the threshold population Z-score and the absolute value of the customer-specific Z-score exceeds the threshold customer-specific Z-score. In other implementations, the anomaly detection application detects an anomaly when either the absolute value of the population Z-score exceeds the threshold population Z-score or the absolute value of the customer-specific Z-score exceeds the threshold customer-specific Z-score.

In yet other implementations, the anomaly detection application detects an anomaly based on the extent to which the absolute value of the population Z-score and the absolute value of the customer-specific Z-score exceed the threshold population Z-score and the threshold customer-specific Z-score, respectively. For example, the anomaly detection application may assign a network score based on the difference between the absolute value of the population Z-score and the threshold population Z-score. The anomaly detection application may assign a customer score based on the difference between the absolute value of the customer-specific Z-score and the threshold customer-specific Z-score. Then the anomaly detection application may combine the network score and the customer score in any suitable manner to generate an overall score. The anomaly detection application may detect an anomaly when the overall score exceeds a threshold score.

While the first time period is described herein as 14 days and the second time period is described herein as 1 day, these are merely examples for ease of illustration only. The first and second time periods may be any suitable durations and may be different from each other.

In addition to generating optical profiles based on obtained light levels, the anomaly detection application may generate the optical profiles based on components of the obtained light level signals over time. The anomaly detection application may then compare components of the customer light level signals over the second time period to the optical profiles to identify an abnormal trend in the customer light level signals and detect an anomaly according to the abnormal trend.

Figure 3:
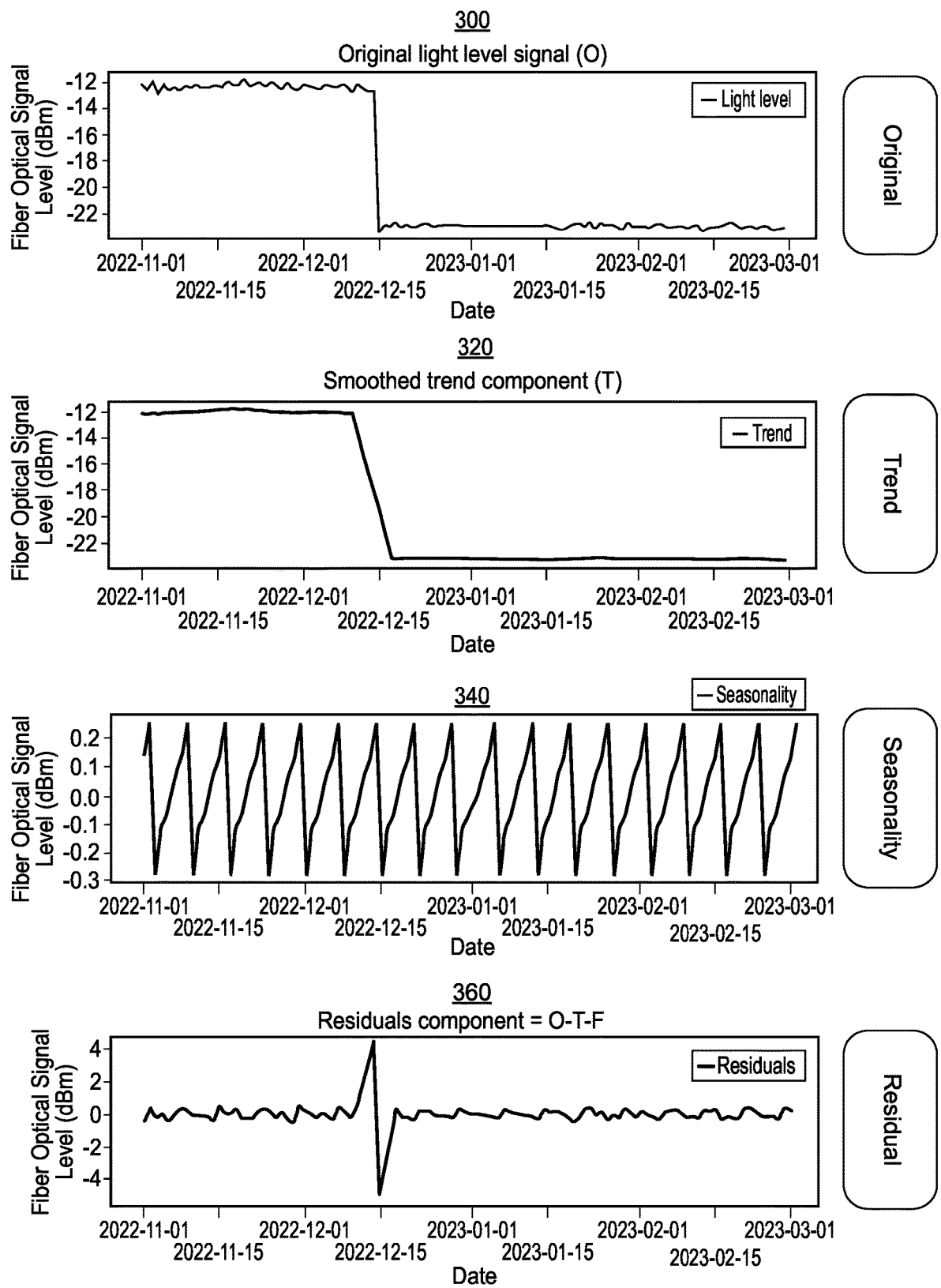
FIG. 3 are example graphs indicating components of the light level of a customer's optical signal as a function of time, including a trend component, a seasonality component, and a residual component.

FIG. 3 illustrates example graphs 300-360 indicating components of the light level of a customer's optical signal 300 as a function of time, including a trend component 320, a seasonality component 340, and a residual component 360. The customer light level signals may be obtained over a first time period (e.g., 14 days).

The anomaly detection application may generate the trend component 320 by filtering the original customer light level signals 300 over the first time period to remove high frequency components and smooth the data. For example, the anomaly detection application may transform the original customer light level signals from the time domain to the frequency domain (e.g., using a Fourier transform). Then the anomaly detection application may filter out the high frequency components above a threshold frequency for example, using a high pass filter. The anomaly detection application may then perform an inverse transform to transform the filtered light level signals back to the time domain to generate the trend component 320.

The anomaly detection application may generate the seasonality component 340 by transforming the trend component 320 from the time domain to the frequency domain (e.g., using a Fourier transform). Then the anomaly detection application may generate the residual component 360 by subtracting the trend and seasonality components 320, 340 from the original customer light level signals 300.

The anomaly detection application may then determine slopes of the trend component 320 by determining a change in light level over a change in time for a third time period (e.g., 1 day, 2 days, 7 days, 10 days, etc.). The third time period may be the same as the second time period (e.g., 1 day) or may be different (e.g., 3 days, 7 days, etc.). In other implementations, the anomaly detection application determines slopes of the original light level signals. In any event, the anomaly detection application may determine a mean slope as the moving average of the slope for the trend component 320 over the previous 14 days. The anomaly detection application may also determine the standard deviation of the slope of the trend component 320 over the previous 14 days. The anomaly detection application may assume a normal or Gaussian distribution for the slope of the trend component 320 having a mean slope ($\mu$) and a standard deviation ($\sigma$) over the first time period as the customer-specific optical profile. Then each day as additional customer light levels are detected, the anomaly detection application may determine an updated moving average of the slope of the trend component 320 over the previous 14 days and an updated standard deviation.

To determine the mean slope and standard deviation for network light level signals, the anomaly detection application may repeat this process for each of the optical signals transmitted to and/or from customer LMTUs, OLTs, FDHs, etc. Then the anomaly detection application may determine the mean and standard deviations of the slopes of the trend components 320 of each of the network light level signals over the first time period.

Additionally, the anomaly detection application may obtain the residuals from the residual component 360 and determine a mean residual as the moving average of the residuals for the residual component 360 over the previous 14 days. The anomaly detection application may also determine the standard deviation of the residuals over the previous 14 days. The anomaly detection application may assume a normal or Gaussian distribution for the residuals having a mean residual ($\mu$) and a standard deviation ($\sigma$) over the first time period as the customer-specific optical profile. Then each day as additional customer light levels are detected, the anomaly detection application may determine an updated moving average of the residuals over the previous 14 days and an updated standard deviation.

To determine the mean residual and standard deviation for network light level signals, the anomaly detection application may repeat this process for each of the optical signals transmitted to and/or from customer LMTUs, OLTs, FDHs, etc. Then the anomaly detection application may determine the mean and standard deviations of the residuals of each of the network light level signals over the first time period.

The anomaly detection application may determine that the slope of the trend component and the residual component for the customer light level signals collected over the third time period deviate from the slopes of the trend components and the residual components for the customer light level signals and the network light level signals collected over the first time period by more than a threshold amount. More specifically, the anomaly detection application may compare the most recent slope of the trend component of the customer light level signals to the mean slope of the customer light level signals and the standard deviation to calculate a customer-specific slope Z-score for the slope of the trend component.

The anomaly detection application may compare the customer-specific slope Z-score to a threshold customer-specific slope Z-score (e.g., −2). Then the anomaly detection application may detect an anomaly if the customer-specific slope Z-score is below the threshold customer-specific slope Z-score.

The anomaly detection application may also compare the most recent slope of the trend component of the customer light level signals to the mean slope of the network light level signals and the standard deviation to calculate a population slope Z-score for the slope of the trend component.

The anomaly detection application may compare the population slope Z-score to a threshold population slope Z-score (e.g., −2). In some implementations, the threshold population slope Z-score is the same as the threshold customer-specific slope Z-score. In other implementations, the threshold population slope Z-score is different from the threshold customer-specific slope Z-score. Then the anomaly detection application may detect an anomaly if the population slope Z-score is below the threshold population slope Z-score.

In some implementations, the anomaly detection application detects an anomaly when the population slope Z-score is below the threshold population slope Z-score and the customer-specific slope Z-score is below the threshold customer-specific slope Z-score. In other implementations, the anomaly detection application detects an anomaly when either the population slope Z-score is below the threshold population slope Z-score or the customer-specific slope Z-score is below the threshold customer-specific slope Z-score.

In yet other implementations, the anomaly detection application detects an anomaly based on the extent to which the population slope Z-score and the customer-specific slope Z-score are below the threshold population slope Z-score and the threshold customer-specific slope Z-score, respectively. For example, the anomaly detection application may assign a network slope score based on the difference between the population slope Z-score and the threshold population slope Z-score. The anomaly detection application may assign a customer slope score based on the difference between the customer-specific slope Z-score and the threshold customer-specific slope Z-score. Then the anomaly detection application may combine the network slope score and the customer slope score in any suitable manner to generate an overall slope score. The anomaly detection application may detect an anomaly when the overall slope score exceeds a threshold score.

The anomaly detection application may compare the most recent residual of the residual component 360 of the customer light level signals to the mean residual of the customer light level signals and the standard deviation to calculate a customer-specific residual Z-score for the residual.

The anomaly detection application may compare the customer-specific residual Z-score to a threshold customer-specific residual Z-score (e.g., −2). Then the anomaly detection application may detect an anomaly if the customer-specific residual Z-score is below the threshold customer-specific residual Z-score.

The anomaly detection application may also compare the most recent residual of the residual component 360 of the customer light level signals to the mean residual of the network light level signals and the standard deviation to calculate a population residual Z-score for the residual.

The anomaly detection application may compare the population residual Z-score to a threshold population residual Z-score (e.g., −2). In some implementations, the threshold population residual Z-score is the same as the threshold customer-specific residual Z-score. In other implementations, the threshold population residual Z-score is different from the threshold customer-specific residual Z-score. Then the anomaly detection application may detect an anomaly if the population residual Z-score is below the threshold population residual Z-score.

In some implementations, the anomaly detection application detects an anomaly when the population residual Z-score is below the threshold population residual Z-score and the customer-specific residual Z-score is below the threshold customer-specific residual Z-score. In other implementations, the anomaly detection application detects an anomaly when either the population residual Z-score is below the threshold population residual Z-score or the customer-specific residual Z-score is below the threshold customer-specific residual Z-score.

In yet other implementations, the anomaly detection application detects an anomaly based on the extent to which the population residual Z-score and the customer-specific residual Z-score are below the threshold population residual Z-score and the threshold customer-specific residual Z-score, respectively. For example, the anomaly detection application may assign a network residual score based on the difference between the population residual Z-score and the threshold population residual Z-score. The anomaly detection application may assign a customer residual score based on the difference between the customer-specific residual Z-score and the threshold customer-specific residual Z-score. Then the anomaly detection application may combine the network residual score and the customer residual score in any suitable manner to generate an overall residual score. The anomaly detection application may detect an anomaly when the overall residual score exceeds a threshold score.

In some implementations, the anomaly detection application detects an anomaly when any suitable combination of the population slope Z-score is below the threshold population slope Z-score, the customer-specific slope Z-score is below the threshold customer-specific slope Z-score, the population residual Z-score is below the threshold population residual Z-score, and/or the customer-specific residual Z-score is below the threshold customer-specific residual Z-score.

In addition to detecting anomalies, the anomaly detection application performs a root cause analysis to detect the root cause of the anomaly for example, based on the location(s) of customer LMTU(s) where anomalies are detected during the second time period. For example, if an anomaly is detected at one customer LMTU 106*a* for a particular day, the anomaly detection application may determine that the root cause is the customer LMTU 106*a* and/or the optical fiber 112*a* coupled to the customer LMTU 106*a*. In some implementations, the anomaly detection application may transmit a control signal to the LMTU 106*a* to automatically reboot or reset the LMTU 106*a* or the light source emitting optical signals from the LMTU 106*a*. In other implementations, the anomaly detection application may send a service technician to repair the LMTU 106*a*, or the optical fiber 112*a* coupled to the LMTU 106*a*.

On the other hand, if the anomaly is detected at multiple LMTUs 106*a*-106*n* coupled to the FDH 116*a* on a particular day, the anomaly detection application may determine that the root cause is the FDH 116*a*, the optical splitter 114*a* disposed, located, implemented, etc. in the FDH 116*a*, or the F1 optical fiber 110*a* coupled to the FDH 116*a*. In some implementations, the anomaly detection application may transmit a control signal to the FDH 116*a* to automatically reboot or reset the FDH 116*a*, the optical splitter 114*a* or the light source emitting optical signals from the FDH 116*a*. In other implementations, the anomaly detection application may transmit a control signal to the OLT 102 to automatically reboot or reset the OLT 102 or the light source emitting optical signals from the OLT 102. In yet other implementations, the anomaly detection application may send a service technician to repair the FDH 116*a*, the F1 optical fiber 110*a*, or the optical splitter 114*a*.

The anomaly detection application may identify the component(s) connected to each of the customer LMTU(s) where anomalies are detected during the second time period. Then the anomaly detection application may determine that the root cause is from one or more of the identified component(s).

Figure 4:
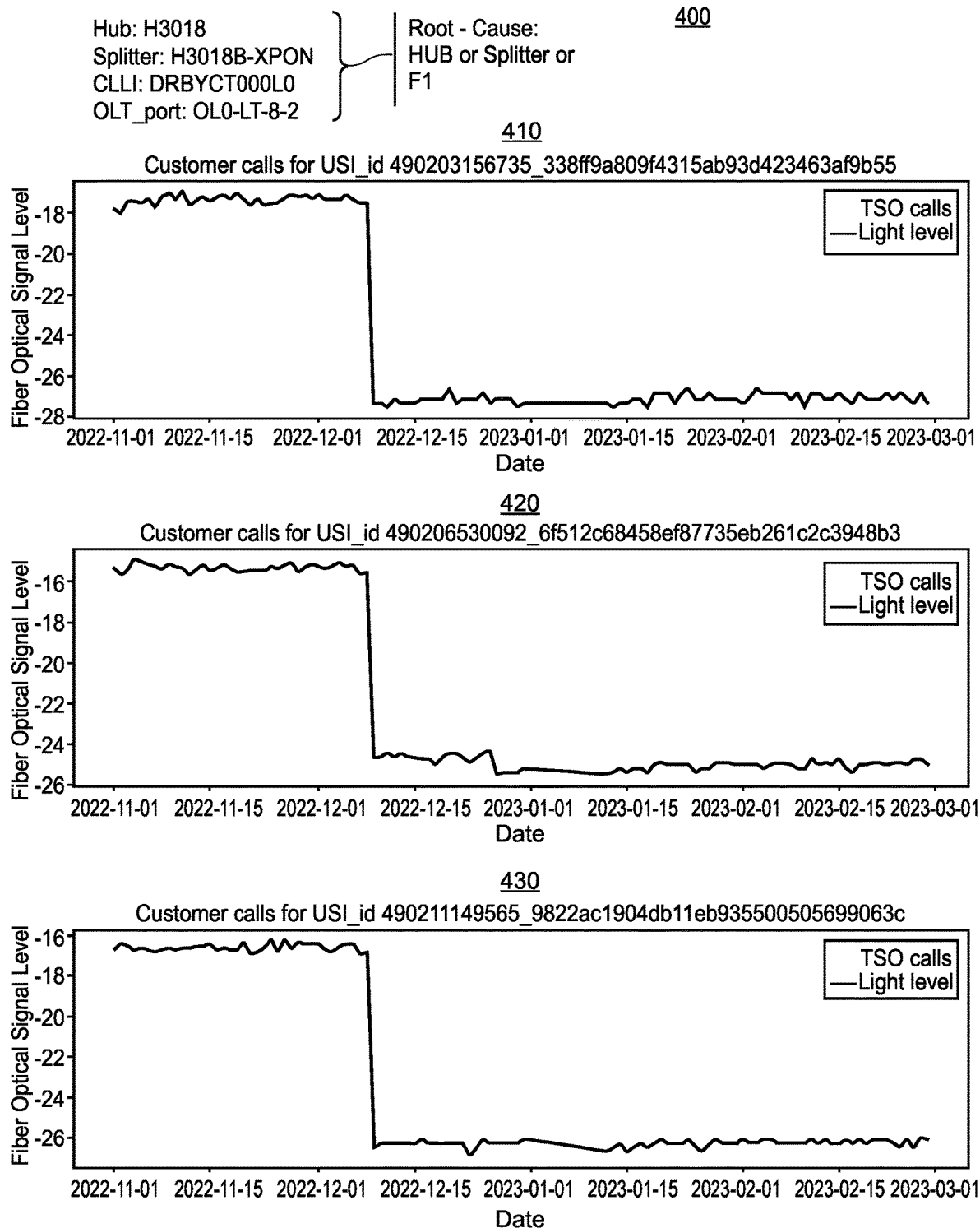
FIG. 4 illustrates an example root cause analysis based on anomalies detected for multiple customers according to their light level signals as a function of time.

FIG. 4 illustrates an example root cause analysis 400 based on anomalies detected for multiple customers according to their light level signals as a function of time 410-430. As shown in FIG. 4, customer light level signals 410-430 are analyzed for three customer LMTUs 106*a*-106*n*. The anomaly detection application detects an anomaly in the customer light level signals 410-430 during the same second time period (on about December 10) due to a significant drop in the light level for each of the optical signals over the second time period. Each of the light levels simultaneously drop from about −16 to −18 dBm to about −26 to −28 dBm. The anomaly detection application may determine that each of the three customer LMTUs 106*a*-106*n* are connected to the same FDH 116*a*. Accordingly, the anomaly detection application determines that the root cause of the anomaly is the FDH 116*a*, the optical splitter 114*a* disposed, located, implemented, etc. in the FDH 116*a*, or the F1 optical fiber 110*a* coupled to the FDH 116*a*.

In some implementations, the anomaly detection application may transmit a control signal to the FDH 116*a* to automatically reboot or reset the FDH 116*a*, the optical splitter 114*a* or the light source emitting optical signals from the FDH 116*a*. In other implementations, the anomaly detection application may transmit a control signal to the OLT 102 to automatically reboot or reset the OLT 102 or the light source emitting optical signals from the OLT 102. In yet other implementations, the anomaly detection application may send a service technician to repair the FDH 116*a*, the F1 optical fiber 110*a*, or the optical splitter 114*a*.

Figure 5:
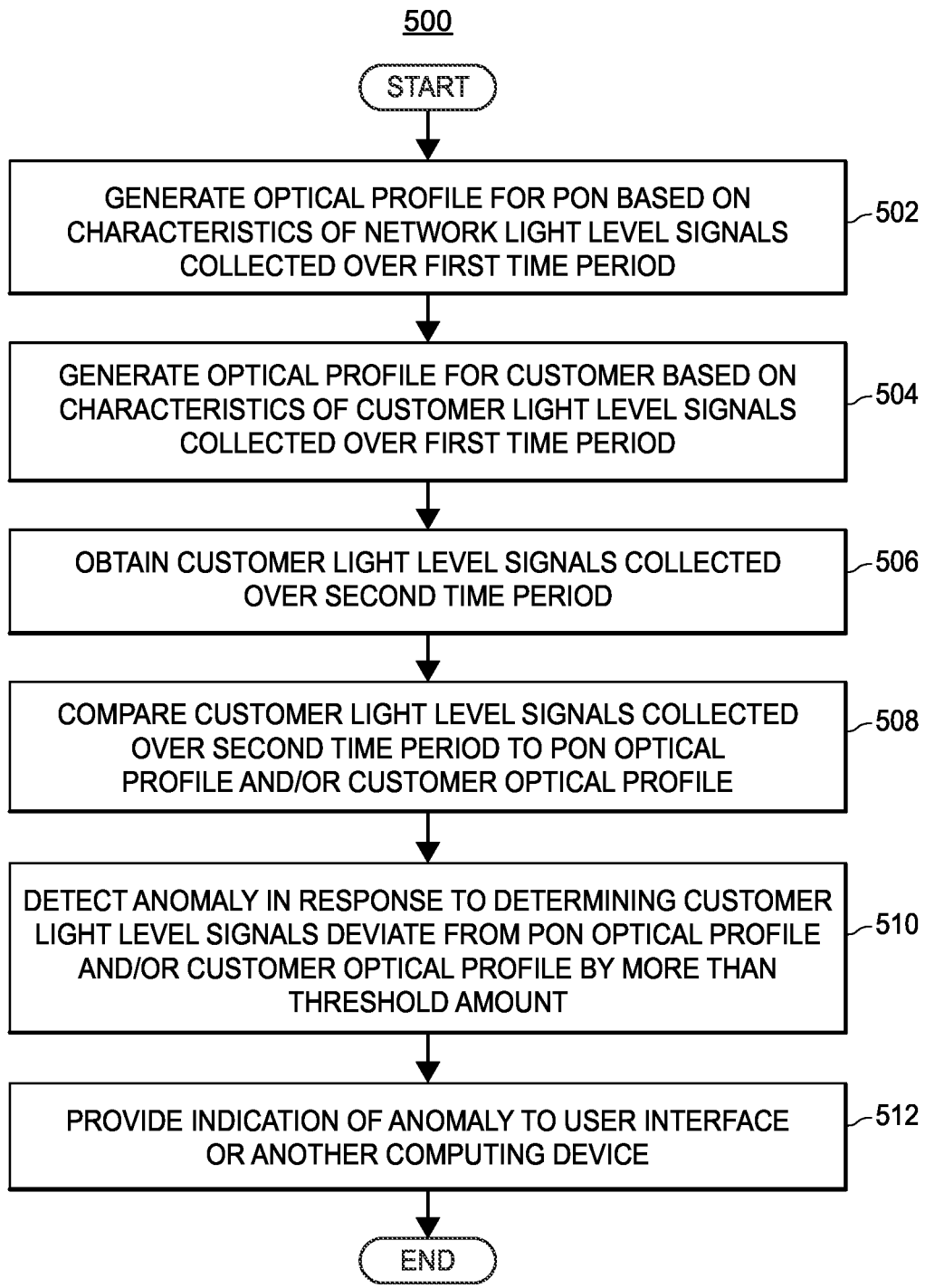
FIG. 5 is a flowchart representative of an example method for detecting an anomaly in a PON using light level detection, which may be performed by a computing device of FIG. 1.

FIG. 5 depicts a flow diagram of an example method 500 for detecting an anomaly in a PON 100 using light level detection. The method 500 may be performed by the server 130, the computing device 125, or any suitable combination of the two.

At block 502, the method 500 includes generating an optical profile for a PON 100 based on characteristics of network light level signals collected over a first time period. For example, the characteristics may be the light levels of the network light level signals. The characteristics may also include a mean light level of the network light level signals, which may be a moving average of the network light levels over the first time period. Additionally, the characteristics may include a standard deviation of the network light level signals.

To generate the optical profile for the PON 100, the server 130 obtains the network light level signals across the PON 100 over the first time period. For example, the server 130 may obtain a light level once a day from each of the components in the PON 100 over a 14 day period. Then the server 130 may generate a distribution of network light level signals based on the obtained light levels over the 14 day period. The server 130 may assume a normal or Gaussian distribution for the network light level signals having a mean light level ($\mu$) and a standard deviation ($\sigma$) over the first time period as the optical profile for the PON 100.

The characteristics of the network light levels may also include components of the obtained light level signals over time. For example, the characteristics may include a slope of a trend component and a residual component. In these implementations, to generate the optical profile for the PON, the server 130 may determine a mean slope as the moving average of the slope for the trend component of network light level signals over the previous 14 days. The server 130 may also determine the standard deviation of the slope of the trend component over the previous 14 days. The server 130 may assume a normal or Gaussian distribution for the slope of the trend component having a mean slope ($\mu$) and a standard deviation ($\sigma$) over the first time period as the optical profile.

Additionally, the server 130 may determine a mean residual as the moving average of the residuals for the residual components of network light level signals over the previous 14 days. The server 130 may also determine the standard deviation of the residuals over the previous 14 days. The server 130 may assume a normal or Gaussian distribution for the residuals having a mean residual ($\mu$) and a standard deviation ($\sigma$) over the first time period as the optical profile.

The method 500 also includes generating a customer-specific optical profile for a customer based on characteristics of customer light level signals collected over the first time period (block 504). To generate the customer-specific optical profile for the customer's LMTU 106, the server 130 obtains the customer light level signals over the first time period. For example, the server 130 may obtain a light level once a day from the customer's LMTU 106*a* over a 14 day period. Then the server 130 may generate a distribution of customer light level signals based on the obtained light levels over the 14 day period. The server 130 may assume a normal or Gaussian distribution for the customer light level signals having a mean light level ($\mu$) and a standard deviation ($\sigma$) over the first time period as the customer optical profile.

The characteristics of the customer light levels may also include components of the obtained light level signals over time. For example, the characteristics may include a slope of a trend component and a residual component. In these implementations, to generate the customer optical profile, the server 130 may determine a mean slope as the moving average of the slope for the trend component of customer light level signals over the previous 14 days. The server 130 may also determine the standard deviation of the slope of the trend component over the previous 14 days. The server 130 may assume a normal or Gaussian distribution for the slope of the trend component having a mean slope ($\mu$) and a standard deviation ($\sigma$) over the first time period as the customer optical profile.

Additionally, the server 130 may determine a mean residual as the moving average of the residuals for the residual components of customer light level signals over the previous 14 days. The server 130 may also determine the standard deviation of the residuals over the previous 14 days. The server 130 may assume a normal or Gaussian distribution for the residuals having a mean residual ($\mu$) and a standard deviation ($\sigma$) over the first time period as the customer optical profile.

At block 506, the method 500 includes obtaining customer light level signals collected during a second time period. The second time period may be different from the first time period and may be shorter than the first time period. For example, the second time period may be one day.

Then at block 508, the method 500 includes comparing the customer light levels collected during the second time period to the optical profile for the PON 100 and/or the customer-specific optical profile. For example, the server 130 may calculate a population Z-score for the obtained customer level light level (X) by comparing the obtained customer light level (X) to the mean light level ($\mu$) and the standard deviation ($\sigma$) for the network light level signals collected over the previous 14 days. The server 130 may also calculate a customer-specific Z-score for the obtained customer level light level (X) by comparing the obtained customer light level (X) to the mean light level ($\mu$) and the standard deviation ($\sigma$) for the customer light level signals collected over the previous 14 days.

In some implementations, the server 130 calculates a population slope Z-score for the slope of the trend component of the customer light level by comparing the slope of the trend component to the mean slope and the standard deviation for the network light level signals collected over the previous 14 days. Additionally, the server 130 calculates a population residual Z-score for the residual of the customer light level by comparing the residual to the mean residual and the standard deviation for the network light level signals collected over the previous 14 days. Still further, the server 130 may calculate a customer-specific slope Z-score for the slope of the trend component of the customer light level by comparing the slope of the trend component to the mean slope and the standard deviation for the customer light level signals collected over the previous 14 days. Additionally, the server 130 calculates a customer-specific residual Z-score for the residual of the customer light level by comparing the residual to the mean residual and the standard deviation for the customer light level signals collected over the previous 14 days.

In response to determining the customer light levels collected during the second time period deviate from the optical profile for the PON 100 and/or the customer-specific optical profile by more a threshold amount, the method 500 includes detecting an anomaly (block 510). For example, the server 130 may detect an anomaly when the absolute value of the population Z-score exceeds a threshold population Z-score and the absolute value of the customer-specific Z-score exceeds a threshold customer-specific Z-score. In other implementations, the server 130 detects an anomaly when either the absolute value of the population Z-score exceeds the threshold population Z-score or the absolute value of the customer-specific Z-score exceeds the threshold customer-specific Z-score. In other implementations, the server 130 may detect an anomaly when any suitable combination of the population slope Z-score is below a threshold population slope Z-score, the customer-specific slope Z-score is below a threshold customer-specific slope Z-score, the population residual Z-score is below a threshold population residual Z-score, and/or the customer-specific residual Z-score is below a threshold customer-specific residual Z-score.

At block 512, the method 500 includes providing an indication of the detected anomaly for display on a user interface or other computing device 125. For example, the server 130 may present an indication of the detected anomaly on the user interface for a service technician to review. The indication may include a date and time of the anomaly as well as the customer's LMTU 106a where the anomaly was detected. The indication may also include a root cause of the anomaly, such as the component or components which likely caused the anomaly.

Figure 6:
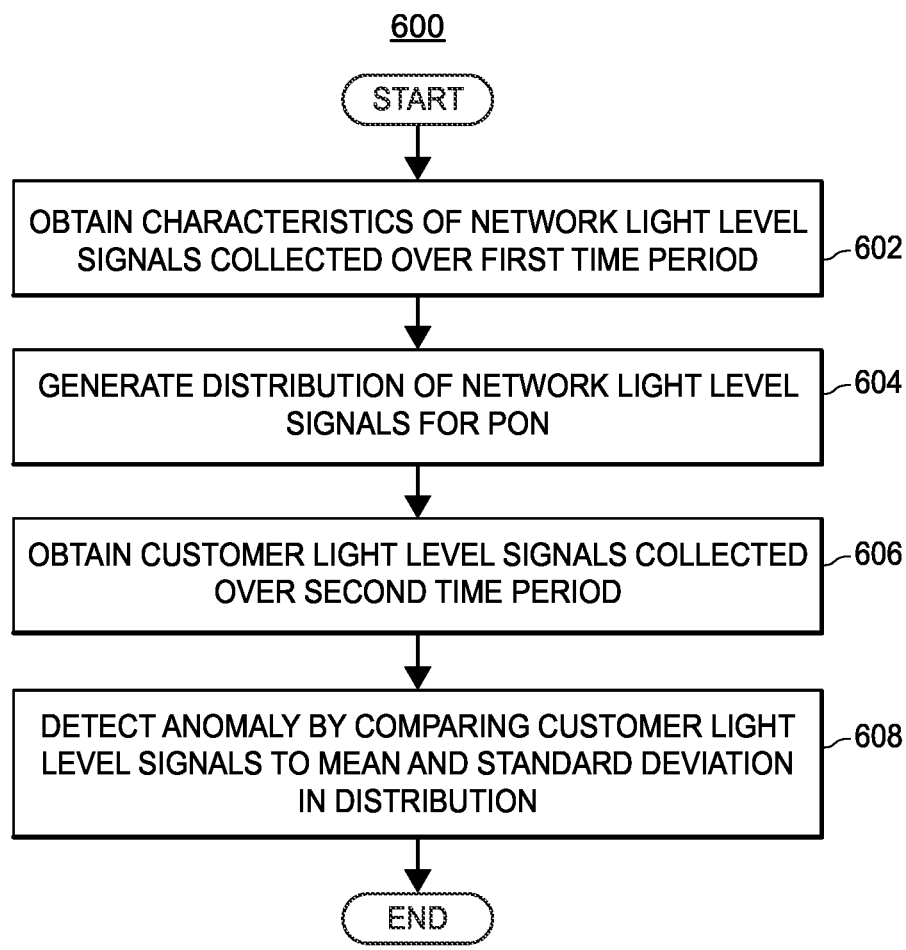
FIG. 6 is a flowchart representative of an example method for detecting an anomaly by comparing a customer's light level signals to a distribution of network light level signals for the PON, which may be performed by a computing device of FIG. 1.

FIG. 6 depicts a flow diagram of an example method 600 for detecting an anomaly by comparing a customer's light level signals to a distribution of network light level signals for the PON 100. The method 600 may be performed by the server 130, the computing device 125, or any suitable combination of the two. The method 600 may be a detailed version of some portions of the method 500.

At block 602, the method 600 includes obtaining characteristics of network light level signals collected over a first time period. The characteristics may also include a mean light level of the network light level signals, which may be a moving average of the network light levels over the first time period. Additionally, the characteristics may include a standard deviation of the network light level signals.

Then at block 604, the method 600 includes generating a distribution of network light level signals for the PON 100. For example, the distribution may be a normal or Gaussian distribution having a mean light level ($\mu$) and a standard deviation ($\sigma$) over the first time period.

The method 600 also includes obtaining one or more customer light level signals collected over a second time period (block 606). Then at block 608, the method 600 includes comparing the customer light level signals to the mean light level and standard deviation of the network light level signals from the distribution. For example, the server 130 may calculate a population Z-score for the obtained customer level light level from the customer light level signals (X) by comparing the obtained customer light level (X) to the mean light level ($\mu$) and the standard deviation ($\sigma$) for the network light level signals collected over the previous 14 days. The server 130 may then detect an anomaly when the absolute value of the population Z-score exceeds a threshold population Z-score.

Figure 7:
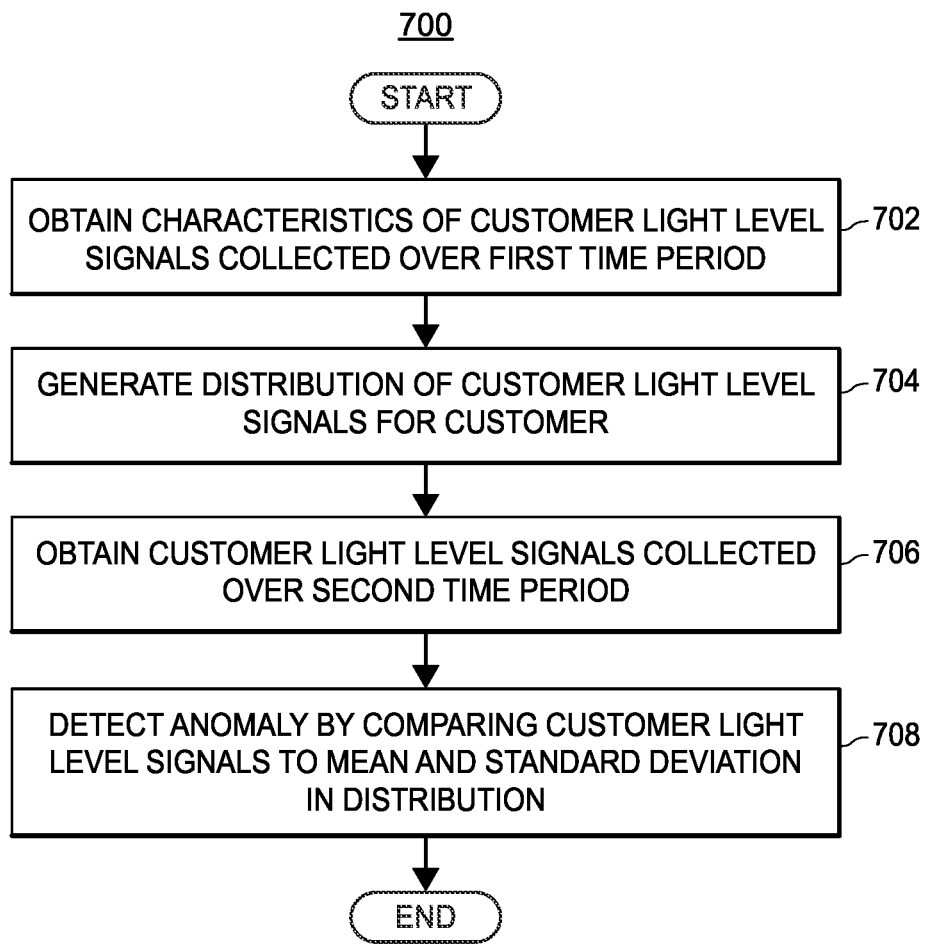
FIG. 7 is a flowchart representative of an example method for detecting an anomaly by comparing a customer's light level signals to a distribution of customer light level signals for the customer, which may be performed by a computing device of FIG. 1.

FIG. 7 depicts a flow diagram of an example method 700 for detecting an anomaly by comparing a customer's light level signals to a distribution of customer light level signals for the customer's LMTU 106a. The method 700 may be performed by the server 130, the computing device 125, or any suitable combination of the two. The method 700 may be a detailed version of some portions of the method 500.

At block 702, the method 700 includes obtaining characteristics of customer light level signals collected over a first time period. The characteristics may also include a mean light level of the customer light level signals, which may be a moving average of the customer light levels over the first time period. Additionally, the characteristics may include a standard deviation of the customer light level signals.

Then at block 704, the method 700 includes generating a distribution of customer light level signals transmitted to or from the customer's LMTU 106a. For example, the distribution may be a normal or Gaussian distribution having a mean light level ($\mu$) and a standard deviation ($\sigma$) over the first time period.

The method 700 also includes obtaining one or more customer light level signals collected over a second time period (block 706). Then at block 708, the method 700 includes comparing the customer light level signals to the mean light level and standard deviation of the customer light level signals from the distribution. For example, the server 130 may calculate a customer-specific Z-score for the obtained customer level light level (X) by comparing the obtained customer light level (X) to the mean light level ($\mu$) and the standard deviation ($\sigma$) for the customer light level signals collected over the previous 14 days. The server 130 may then detect an anomaly when the absolute value of the customer-specific Z-score exceeds a threshold customer-specific Z-score.

Figure 8:
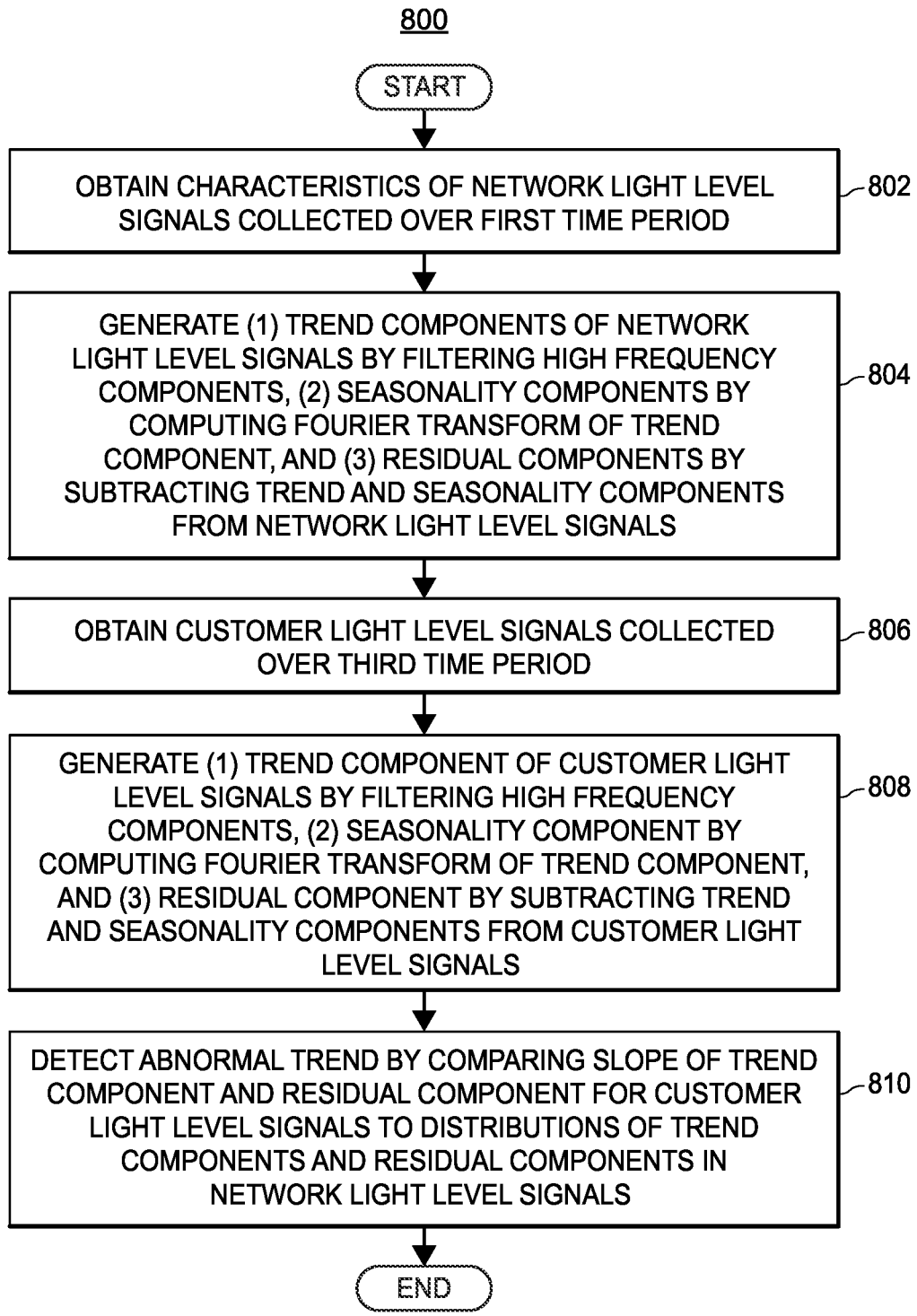
FIG. 8 is a flowchart representative of an example method for detecting an abnormal trend by comparing a slope of a trend component and a residual component in a customer's light level signals to a slope of a trend component and a residual component in a distribution of network light level signals for the PON, which may be performed by a computing device of FIG. 1.

FIG. 8 depicts a flow diagram of an example method 800 for an abnormal trend by comparing a slope of a trend component and a residual component in a customer's light level signals to a slope of a trend component and a residual component in a distribution of network light level signals for the PON 100. The method 800 may be performed by the server 130, the computing device 125, or any suitable combination of the two. The method 800 may be a detailed version of some portions of the method 500.

At block 802, the method 800 includes obtaining characteristics of network light level signals collected over a first time period. Then at block 804, the method 800 includes generating (1) trend components of network light level signals by filtering high frequency components of the original network light level signals. For example, the server 130 may filter high frequency components above a threshold frequency from the original network light level signals by using a high pass filter. The method 800 also includes generating (2) seasonality components of network light level signals by computing Fourier transforms of the trend components. Moreover, the method 800 includes generating (3) residual components of network light level signals by subtracting the seasonality component and the trend component from the original network light level signals for each of the optical signals transmitted to and/or from customer LMTUs, OLTs, FDHs, etc.

In some implementations, the server 130 may generate a distribution of slopes of trend components for the network light level signals. The server 130 may determine slopes of trend components by for example determining a change in light level over a change in time for a third time period (e.g., 1 day, 2 days, 7 days, 10 days, etc.).

The server 130 may also generate a distribution of residuals for the network light level signals. For example, the distribution may be a normal or Gaussian distribution having a mean residual ($\mu$) and a standard deviation ($\sigma$) over the first time period.

At block 806, the method 800 includes obtaining one or more customer light level signals collected over a second and/or third time period. Then a trend component, seasonality component, and residual component is generated for the customer light level signals (block 808). The server 130 may also determine a slope of the trend component, by for example determining a change in light level over a change in time for the third time period (e.g., 1 day, 2 days, 7 days, 10 days, etc.). For example, the server 130 may determine the slope of the trend component based on the change in the trend component from the previous day. In other implementations, the server 130 may detect the slope of the trend component based on the change in the trend component over the last 3 days.

At block 810, the method 800 includes detecting an abnormal trend by comparing the slope of the trend component and a residual in the residual component in the customer light level signals to distributions of slopes of trend components and residuals in the network light level signals. The server 130 may compare the most recent slope of the trend component of the customer light level signals to the mean slope of the network light level signals and the standard deviation to calculate a population slope Z-score for the slope of the trend component. Then the server 130 may detect an anomaly if the population slope Z-score is below the threshold population slope Z-score.

Additionally, the server 130 may compare the most recent residual of the residual component of the customer light level signals to the mean residual of the network light level signals and the standard deviation to calculate a population residual Z-score for the residual. Then the server 130 may detect an anomaly if the population residual Z-score is below the threshold population residual Z-score. In other implementations, the server 130 detects an anomaly when both the population slope Z-score is below the threshold population slope Z-score and the population residual Z-score is below the threshold population residual Z-score.

Figure 9:
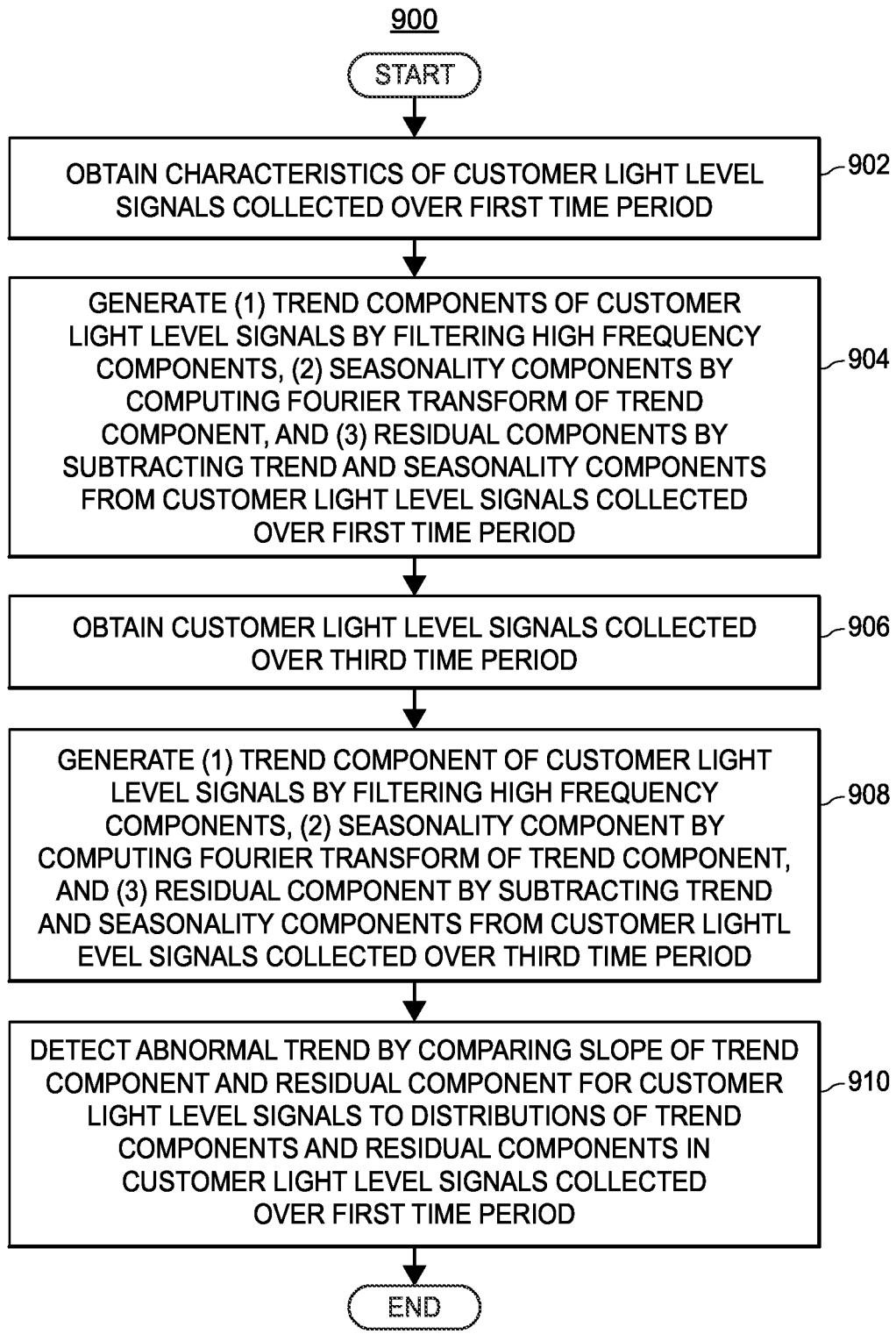
FIG. 9 is a flowchart representative of an example method for detecting an abnormal trend by comparing a slope of a trend component and a residual component in a customer's light level signals to a slope of a trend component and a residual component in a distribution of customer light level signals for the customer, which may be performed by a computing device of FIG. 1.

FIG. 9 depicts a flow diagram of an example method 900 for an abnormal trend by comparing a slope of a trend component and a residual component in a customer's light level signals to a slope of a trend component and a residual component in a distribution of customer light level signals for the customer's LMTU 106a. The method 900 may be performed by the server 130, the computing device 125, or any suitable combination of the two. The method 900 may be a detailed version of some portions of the method 500.

At block 902, the method 900 includes obtaining characteristics of customer light level signals transmitted to or from the customer's LMTU 106a and collected over a first time period. Then at block 904, the method 900 includes generating (1) a trend component of the customer light level signals by filtering high frequency components of the original customer light level signals. For example, the server 130 may filter high frequency components above a threshold frequency from the original customer light level signals by using a high pass filter. The method 900 also includes generating (2) a seasonality component of the customer light level signals by computing a Fourier transform of the trend component. Moreover, the method 900 includes generating (3) a residual component of the customer light level signals by subtracting the seasonality component and the trend component from the original customer light level signals.

In some implementations, the server 130 may generate a distribution of slopes of trend components for the customer light level signals. The server 130 may determine slopes of trend components by for example determining a change in light level over a change in time for a third time period (e.g., 1 day, 2 days, 7 days, 10 days, etc.).

The server 130 may also generate a distribution of residuals for the customer light level signals. For example, the distribution may be a normal or Gaussian distribution having a mean residual ($\mu$) and a standard deviation ($\sigma$) over the first time period.

At block 906, the method 900 includes obtaining one or more customer light level signals collected over a second and/or third time period. Then a trend component, seasonality component, and residual component is generated for the customer light level signals (block 908). The server 130 may also determine a slope of the trend component, by for example determining a change in light level over a change in time for the third time period (e.g., 1 day, 2 days, 7 days, 10 days, etc.). For example, the server 130 may determine the slope of the trend component based on the change in the trend component from the previous day. In other implementations, the server 130 may detect the slope of the trend component based on the change in the trend component over the last 3 days.

At block 910, the method 900 includes detecting an abnormal trend by comparing the slope of the trend component and a residual in the residual component in the customer light level signals collected over the second time period to distributions of slopes of trend components and residuals in the customer light level signals collected over the first time period. The server 130 may compare the most recent slope of the trend component of the customer light level signals to the mean slope of the customer light level signals and the standard deviation to calculate a customer-specific slope Z-score for the slope of the trend component. Then the server 130 may detect an anomaly if the customer-specific slope Z-score is below the threshold customer-specific slope Z-score.

Additionally, the server 130 may compare the most recent residual of the residual component of the customer light level signals to the mean residual of the customer light level signals and the standard deviation to calculate a customer-specific residual Z-score for the residual. Then the server 130 may detect an anomaly if the customer-specific residual Z-score is below the threshold customer-specific residual Z-score. In other implementations, the server 130 detects an anomaly when both the customer-specific slope Z-score is below the threshold customer-specific slope Z-score and the customer-specific residual Z-score is below the threshold customer-specific residual Z-score.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A method for detecting an anomaly in a Passive Optical Network (PON) using light level detection, the method comprising: generating an optical profile for a PON based on one or more characteristics of network light level signals collected over a first time period and delivered over the PON, the PON including an optical line terminal (OLT) optically connected to a plurality of optical network terminals (ONTs) via a plurality of optical fibers; generating an optical profile for a customer based on one or more characteristics of customer light level signals collected over the first time period and delivered over the PON to or from an ONT for the customer; obtaining one or more customer light level signals collected over a second time period and delivered over the PON to or from the ONT for the customer; detecting an anomaly in the PON for the customer in response to determining that the one or more customer light level signals collected over the second time period deviate from the optical profile for the customer or the optical profile for the PON by more than a threshold amount; and providing an indication of the anomaly to at least one of a user interface or another computing device.

2. The method of example 1, further comprising: transmitting a control signal to automatically reboot a component of the PON in response to detecting the anomaly.

3. The method of example 1 or example 2, further comprising: performing a root cause analysis to detect a cause of the anomaly based on locations of customers with detected anomalies during the second time period.

4. The method of any of the preceding examples, further comprising: detecting, via an optical detector, the customer light level signals or the network light level signals at an upstream or downstream endpoint of at least one of the plurality of optical fibers.

5. The method of any of the preceding examples, wherein the one or more characteristics of the customer or network light level signals includes at least one of: a mean light level signal, a standard deviation in the light level signal, or a slope of the light level signal.

6. The method of any of the preceding examples, wherein the mean light level signal is a moving average over the first time period.

7. The method of any of the preceding examples, wherein determining that the one or more customer light level signals deviate from the optical profile for the customer or the optical profile for the PON by more than the threshold amount includes: determining a customer light level over the second time period; determining a Z-score for the customer light level by comparing the customer light level to the mean light level signal and the standard deviation in the light level signal for the network light level signals collected over the first time period; and determining that the Z-score exceeds a threshold Z-score.

8. The method of any of the preceding examples, wherein the Z-score is a population Z-score, the threshold Z-score is a first threshold Z-score, and further comprising: determining a customer-specific Z-score for the customer light level by comparing the customer light level to the mean light level signal and the standard deviation in the light level signal for the customer light level signals collected over the first time period; determining that the customer-specific Z-score exceeds a second threshold Z-score; and determining that the one or more customer light level signals deviate from the optical profile for the customer and the optical profile for the PON by more than the threshold amount in response to determining that the population Z-score exceeds the first threshold Z-score and the customer specific Z-score exceeds the second threshold Z-score.

9. The method of any of the preceding examples, wherein determining that the one or more customer light level signals deviate from the optical profile for the customer or the optical profile for the PON by more than the threshold amount includes: detecting an abnormal trend in the one or more customer light level signals collected over the second time period.

10. The method of any of the preceding examples, wherein detecting the abnormal trend includes: generating a trend component of customer light level signals collected over a third time period by filtering out frequency components which exceed a threshold frequency; generating a seasonality component of the customer light level signals collected over the third time period by computing a Fourier transform of the trend component; generating a residual component of the customer light level signals collected over the third time period by subtracting the trend component and the seasonality component from the customer light level signals collected over the third time period; comparing a slope of the trend component and the residual component to a slope of a trend component and a residual component for the customer light level signals collected over the first time period; comparing the slope of the trend component and the residual component to a slope of a trend component and a residual component for the network light level signals collected over the first time period; detecting the abnormal trend in response to determining that the slope of the trend component and the residual component for the customer light level signals collected over the third time period deviate from the slope of the trend component and the residual component for the customer light level signals and the network light level signals collected over the first time period by more than a threshold amount.

11. A computing device for detecting an anomaly in a Passive Optical Network (PON) using light level detection, the computing device comprising: one or more processors; and a non-transitory computer-readable memory storing instructions thereon that, when executed by the one or more processors, cause the computing device to: generate an optical profile for a PON based on one or more characteristics of network light level signals collected over a first time period and delivered over the PON, the PON including an optical line terminal (OLT) optically connected to a plurality of optical network terminals (ONTs) via a plurality of optical fibers; generate an optical profile for a customer based on one or more characteristics of customer light level signals collected over the first time period and delivered over the PON to or from an ONT for the customer; obtain one or more customer light level signals collected over a second time period and delivered over the PON to or from the ONT for the customer; detect an anomaly in the PON for the customer in response to determining that the one or more customer light level signals collected over the second time period deviate from the optical profile for the customer or the optical profile for the PON by more than a threshold amount; and provide an indication of the anomaly to at least one of a user interface or another computing device.

12. The computing device of example 11, wherein the instructions further cause the computing device to: transmit a control signal to automatically reboot a component of the PON in response to detecting the anomaly.

13. The computing device of example 11 or example 12, wherein the instructions further cause the computing device to: perform a root cause analysis to detect a cause of the anomaly based on locations of customers with detected anomalies during the second time period.

14. The computing device of any of examples 11 to 13, wherein the instructions further cause the computing device to: detect, via an optical detector, the customer light level signals or the network light level signals at an upstream or downstream endpoint of at least one of the plurality of optical fibers.

15. The computing device of any of examples 11 to 14, wherein the one or more characteristics of the customer or network light level signals includes at least one of: a mean light level signal, a standard deviation in the light level signal, or a slope of the light level signal.

16. The computing device of any of examples 11 to 15, wherein the mean light level signal is a moving average over the first time period.

17. The computing device of any of examples 11 to 16, wherein to determine that the one or more customer light level signals deviate from the optical profile for the customer or the optical profile for the PON by more than the threshold amount, the instructions cause the computing device to: determine a customer light level over the second time period; determine a Z-score for the customer light level by comparing the customer light level to the mean light level signal and the standard deviation in the light level signal for the network light level signals collected over the first time period; and determine that the Z-score exceeds a threshold Z-score.

18. The computing device of any of examples 11 to 17, wherein the Z-score is a population Z-score, the threshold Z-score is a first threshold Z-score, and the instructions further cause the computing device to: determine a customer-specific Z-score for the customer light level by comparing the customer light level to the mean light level signal and the standard deviation in the light level signal for the customer light level signals collected over the first time period; determine that the customer-specific Z-score exceeds a second threshold Z-score; and determine that the one or more customer light level signals deviate from the optical profile for the customer or the optical profile for the PON by more than the threshold amount in response to determining that the population Z-score exceeds the first threshold Z-score and the customer specific Z-score exceeds the second threshold Z-score.

19. The computing device of any of examples 11 to 18, wherein to determine that the one or more customer light level signals deviate from the optical profile for the customer or the optical profile for the PON by more than the threshold amount, the instructions cause the computing device to: detect an abnormal trend in the one or more customer light level signals collected over the second time period.

20. The computing device of any of examples 11 to 19, wherein to detect the abnormal trend, the instructions cause the computing device to: generate a trend component of customer light level signals collected over the third time period by filtering out frequency components which exceed a threshold frequency; generate a seasonality component of the customer light level signals collected over the third time period by computing a Fourier transform of the trend component; generate a residual component of the customer light level signals collected over the third time period by subtracting the trend component and the seasonality component from the customer light level signals collected over the third time period; compare a slope of the trend component and the residual component to a slope of a trend component and a residual component for the customer light level signals collected over the first time period; compare the slope of the trend component and the residual component to a slope of a trend component and a residual component for the network light level signals collected over the first time period; and detect the abnormal trend in response to determining that the slope of the trend component and the residual component for the customer light level signals collected over the third time period deviate from the slope of the trend component and the residual component for the customer light level signals and the network light level signals collected over the first time period by more than a threshold amount.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method for detecting an anomaly in a Passive Optical Network (PON) using light level detection, the method comprising:
   generating an optical profile for a PON based on one or more characteristics of network light level signals collected over a first time period and delivered over the PON, the PON including an optical line terminal (OLT) optically connected to a plurality of optical network terminals (ONTs) via a plurality of optical fibers;
   generating an optical profile for a customer based on one or more characteristics of customer light level signals collected over the first time period and delivered over the PON to or from an ONT for the customer, wherein the one or more characteristics of the customer or network light level signals includes at least one of: a mean light level signal indicating a moving average over the first time period, a standard deviation in the light level signal, or a slope of the light level signal;
   obtaining one or more customer light level signals collected over a second time period and delivered over the PON to or from the ONT for the customer;
   detecting an anomaly in the PON for the customer in response to determining that the one or more customer light level signals collected over the second time period deviate from the optical profile for the customer or the optical profile for the PON by more than a threshold amount; and
   providing an indication of the anomaly to at least one of a user interface or another computing device.

2. The method of claim 1, further comprising:
   transmitting a control signal to automatically reboot a component of the PON in response to detecting the anomaly.

3. The method of claim 1, further comprising:
   performing a root cause analysis to detect a cause of the anomaly based on locations of customers with detected anomalies during the second time period.

4. The method of claim 1, further comprising:
   detecting, via an optical detector, the customer light level signals or the network light level signals at an upstream or downstream endpoint of at least one of the plurality of optical fibers.

5. The method of claim 1, wherein determining that the one or more customer light level signals deviate from the optical profile for the customer or the optical profile for the PON by more than the threshold amount includes:
  determining a customer light level over the second time period;
  determining a Z-score for the customer light level by comparing the customer light level to the mean light level signal and the standard deviation in the light level signal for the network light level signals collected over the first time period; and
  determining that an absolute value of the Z-score exceeds a threshold Z-score.

6. The method of claim 5, wherein the Z-score is a population Z-score, the threshold Z-score is a first threshold Z-score, and further comprising:
  determining a customer-specific Z-score for the customer light level by comparing the customer light level to the mean light level signal and the standard deviation in the light level signal for the customer light level signals collected over the first time period;
  determining that the customer-specific Z-score exceeds a second threshold Z-score; and
  determining that the one or more customer light level signals deviate from the optical profile for the customer and the optical profile for the PON by more than the threshold amount in response to determining that an absolute value of the population Z-score exceeds the first threshold Z-score and an absolute value of the customer specific Z-score exceeds the second threshold Z-score.

7. The method of claim 1, wherein determining that the one or more customer light level signals deviate from the optical profile for the customer or the optical profile for the PON by more than the threshold amount includes:
  detecting an abnormal trend in the one or more customer light level signals collected over the second time period.

8. The method of claim 7, wherein detecting the abnormal trend includes:
  generating a trend component of customer light level signals collected over a third time period by filtering out frequency components which exceed a threshold frequency;
  generating a seasonality component of the customer light level signals collected over the third time period by computing a Fourier transform of the trend component;
  generating a residual component of the customer light level signals collected over the third time period by subtracting the trend component and the seasonality component from the customer light level signals collected over the third time period;
  comparing a slope of the trend component and the residual component to a slope of a trend component and a residual component for the customer light level signals collected over the first time period;
  comparing the slope of the trend component and the residual component to a slope of a trend component and a residual component for the network light level signals collected over the first time period;
  detecting the abnormal trend in response to determining that the slope of the trend component and the residual component for the customer light level signals collected over the third time period deviate from the slope of the trend component and the residual component for the customer light level signals and the network light level signals collected over the first time period by more than a threshold amount.

9. A computing device for detecting an anomaly in a Passive Optical Network (PON) using light level detection, the computing device comprising:
  one or more processors; and
  a non-transitory computer-readable memory storing instructions thereon that, when executed by the one or more processors, cause the computing device to:
    generate an optical profile for a PON based on one or more characteristics of network light level signals collected over a first time period and delivered over the PON, the PON including an optical line terminal (OLT) optically connected to a plurality of optical network terminals (ONTs) via a plurality of optical fibers;
    generate an optical profile for a customer based on one or more characteristics of customer light level signals collected over the first time period and delivered over the PON to or from an ONT for the customer;
    obtain one or more customer light level signals collected over a second time period and delivered over the PON to or from the ONT for the customer;
    detect an anomaly in the PON for the customer in response to determining that the one or more customer light level signals collected over the second time period deviate from the optical profile for the customer or the optical profile for the PON by more than a threshold amount by detecting an abnormal trend in the one or more customer light level signals collected over the second time period; and
    provide an indication of the anomaly to at least one of a user interface or another computing device.

10. The computing device of claim 9, wherein the instructions further cause the computing device to:
  transmit a control signal to automatically reboot a component of the PON in response to detecting the anomaly.

11. The computing device of claim 9, wherein the instructions further cause the computing device to:
  perform a root cause analysis to detect a cause of the anomaly based on locations of customers with detected anomalies during the second time period.

12. The computing device of claim 9, wherein the instructions further cause the computing device to:
  detect, via an optical detector, the customer light level signals or the network light level signals at an upstream or downstream endpoint of at least one of the plurality of optical fibers.

13. The computing device of claim 9, wherein the one or more characteristics of the customer or network light level signals includes at least one of: a mean light level signal, a standard deviation in the light level signal, or a slope of the light level signal.

14. The computing device of claim 13, wherein the mean light level signal is a moving average over the first time period.

15. The computing device of claim 14, wherein to determine that the one or more customer light level signals deviate from the optical profile for the customer or the optical profile for the PON by more than the threshold amount, the instructions cause the computing device to:
  determine a customer light level over the second time period;
  determine a Z-score for the customer light level by comparing the customer light level to the mean light level signal and the standard deviation in the light level signal for the network light level signals collected over the first time period; and determine that an absolute value of the Z-score exceeds a threshold Z-score.

16. The computing device of claim 15, wherein the Z-score is a population Z-score, the threshold Z-score is a first threshold Z-score, and the instructions further cause the computing device to:
- determine a customer-specific Z-score for the customer light level by comparing the customer light level to the mean light level signal and the standard deviation in the light level signal for the customer light level signals collected over the first time period;
- determine that the customer-specific Z-score exceeds a second threshold Z-score; and
- determine that the one or more customer light level signals deviate from the optical profile for the customer or the optical profile for the PON by more than the threshold amount in response to determining that an absolute value of the population Z-score exceeds the first threshold Z-score and an absolute value of the customer specific Z-score exceeds the second threshold Z-score.

17. The computing device of claim 9, wherein to detect the abnormal trend, the instructions cause the computing device to:
- generate a trend component of customer light level signals collected over a third time period by filtering out frequency components which exceed a threshold frequency;
- generate a seasonality component of the customer light level signals collected over the third time period by computing a Fourier transform of the trend component;
- generate a residual component of the customer light level signals collected over the third time period by subtracting the trend component and the seasonality component from the customer light level signals collected over the third time period;
- compare a slope of the trend component and the residual component to a slope of a trend component and a residual component for the customer light level signals collected over the first time period;
- compare the slope of the trend component and the residual component to a slope of a trend component and a residual component for the network light level signals collected over the first time period; and
- detect the abnormal trend in response to determining that the slope of the trend component and the residual component for the customer light level signals collected over the third time period deviate from the slope of the trend component and the residual component for the customer light level signals and the network light level signals collected over the first time period by more than a threshold amount.

\* \* \* \* \*

UNITED STATES PATENT AND TRADEMARK OFFICE
CERTIFICATE OF CORRECTION

| | | |
|---|---|---|
| PATENT NO. | : 12,028,108 B1 | Page 1 of 1 |
| APPLICATION NO. | : 18/441131 | |
| DATED | : July 2, 2024 | |
| INVENTOR(S) | : Milad Mostavi et al. | |

It is certified that error appears in the above-identified patent and that said Letters Patent is hereby corrected as shown below:

On the Title Page

At item (54) and in the Specification Column 1, Lines 1-2:
"Customers" should be --Customer--
"Signal" should be --Signals--

Signed and Sealed this
Twenty-seventh Day of May, 2025

Coke Morgan Stewart
*Acting Director of the United States Patent and Trademark Office*